United States Patent [19]

Meltz et al.

[11] Patent Number: 4,761,073
[45] Date of Patent: Aug. 2, 1988

[54] DISTRIBUTED, SPATIALLY RESOLVING OPTICAL FIBER STRAIN GAUGE

[75] Inventors: Gerald Meltz, Avon; William H. Glenn, Vernon, both of Conn.; Elias Snitzer, Wellesley, Mass.

[73] Assignee: United Technologies Corporation, Hartford, Conn.

[21] Appl. No.: 915,891

[22] Filed: Oct. 3, 1986

Related U.S. Application Data

[63] Continuation of Ser. No. 640,490, Aug. 13, 1984, abandoned.

[51] Int. Cl.$^4$ ............................................. G01B 11/16
[52] U.S. Cl. ..................................... 356/32; 73/800; 250/227
[58] Field of Search ........................... 356/32; 73/800; 250/227

[56] References Cited

U.S. PATENT DOCUMENTS

| | | | |
|---|---|---|---|
| 3,458,257 | 7/1969 | Pryor | 356/32 |
| 3,891,302 | 6/1975 | Dabby et al. | 350/96.19 |
| 4,268,116 | 5/1981 | Schmadel et al. | 350/96.19 X |
| 4,286,838 | 9/1981 | Huignard et al. | 350/96.19 X |
| 4,295,738 | 10/1981 | Meltz et al. | 356/32 |
| 4,400,056 | 8/1983 | Cielo | 350/96.19 |

FOREIGN PATENT DOCUMENTS

| | | | |
|---|---|---|---|
| 0110207 | 8/1980 | Japan | 350/96.19 |
| 1536340 | 12/1978 | United Kingdom | 356/32 |

OTHER PUBLICATIONS

S. K. Yao et al, *Applied Optics*, vol. 21, pp. 3059-3060, (1982).

Primary Examiner—Vincent P. McGraw
Attorney, Agent, or Firm—Peter R. Ruzek; Eric W. Petraske; Robert P. Sabath

[57] ABSTRACT

A distributed, spatially resolving optical fiber strain gauge in which the core of the optical fiber is written with periodic grating patterns effective for transmitting and reflecting light injected into the core. Spectral shifts in the transmitted and reflected light indicate the intensity of strain or temperature variations at positions of the grating corresponding to the associated wavelengths of injected light.

2 Claims, 3 Drawing Sheets

DISTRIBUTED, SPATIALLY RESOLVING OPTICAL FIBER STRAIN GAUGE

This is a continuation application under 37 CFR 1.62 of prior pending application Ser. No. 640,490 filed on Aug. 13, 1984, now abandoned.

TECHNICAL FIELD

This invention relates to the establishment of phase gratings and the optical detection and measurement of strain distributions with multi-wavelength light provided to said phase gratings.

BACKGROUND OF THE INVENTION

It is known to determine the distribution of axial strain or temperature along the length of a fiber optic sensor according to the technique described by S. K. Yao et al. in Volume 21 Applied Optics (1982) pages 3059–3060. According to this technique, very small deformations at the interface between an optical core and its cladding will cause light measurably to couple from core to cladding modes. This permits measurements by time-domain reflectometry or a series of cladding taps to determine transmission loss and the distribution of applied perturbations.

DISCLOSURE OF INVENTION

According to the invention, a strain sensor comprising an optical waveguide including a core for carrying light injected at selected wavelengths is impressed and reflected with one or more periodic phase grating for modifying the reflection and transmission of injected light at the position of said grating in response to conditions of local physical or thermal strain.

BEST MODE FOR CARRYING OUT THE INVENTION

Figure 1:
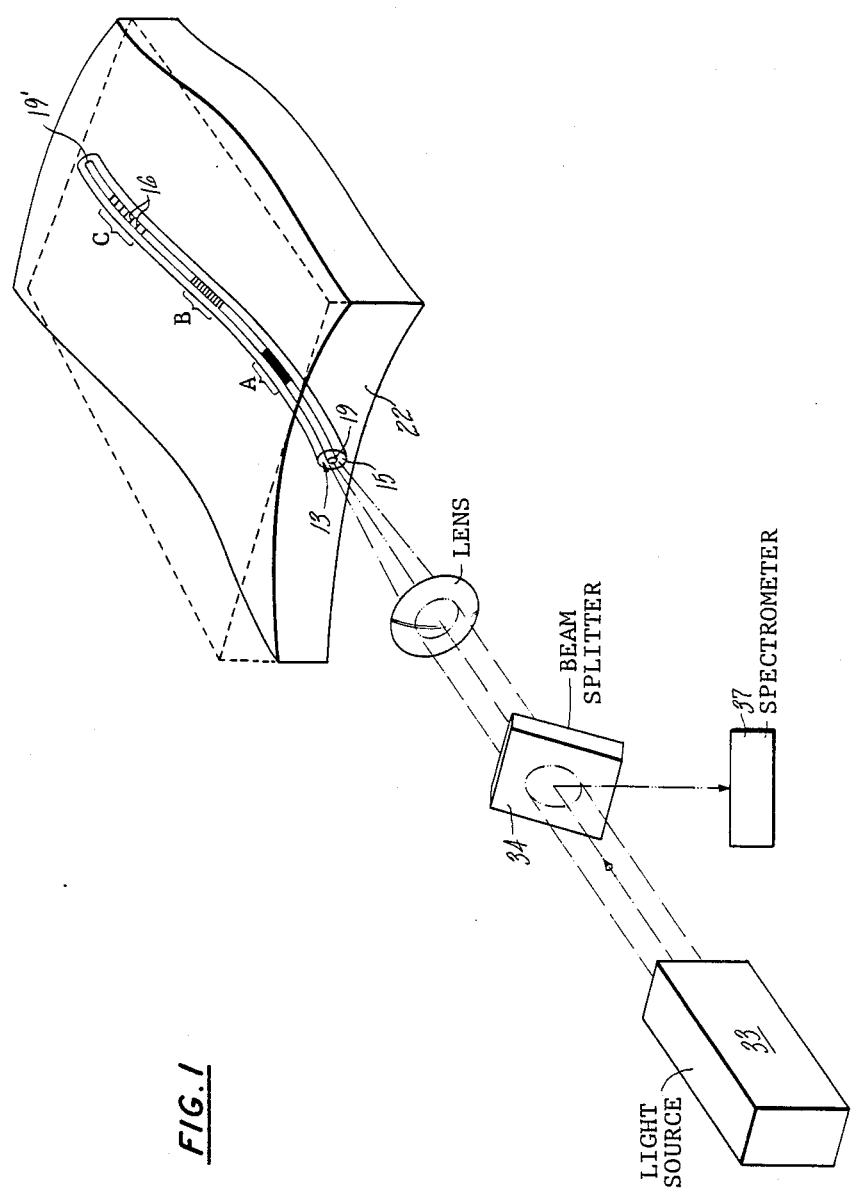
FIG. 1 is a schematic drawing of the spatially resolving optical fiber strain gauge according to the invention addressed herein.

FIG. 1 shows a schematic diagram of the spatially resolving optical fiber strain gauge 13. The gauge 13 includes an optical waveguide 15 or fiber operative to transmit a single or lowest order mode of injected light.

The core 19 of waveguide 15 is preferably a Germanium-doped silica or glass filament. The core 15 contains a series of variable spacing Bragg reflection gratings 16 written, impressed or otherwise applied by application of a variable two-beam ultraviolet (less than 300 nanometers) interference pattern. These periodic gratings 16 or refractive index perturbations are permanently induced by exposure to intense radiation.

Figure 2A:
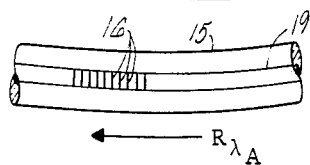
FIGS. 2A through 2C are partial schematics of selected sections of the optical waveguide including its cores, indicating grating patterns of varying spacing corresponding to selected regions A, B and C in a mechanical structure being monitored for strain.
Figure 2B:
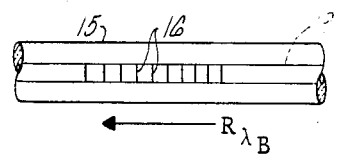
Figure 2C:
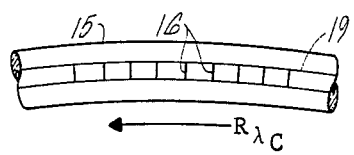

FIGS. 2A through 2C shows the establishment of different wavelength gratings 16 corresponding to respective locations on core 19.

Each of selected gratings 16 is formed by transverse irradiation with a particular wavelength of light in the ultraviolet absorption band of the core material associated with a position in a structural component 22. This procedure establishes a first order absorption process by which gratings 16 each characterized by a specific spacing and wavelength can be formed by illuminating core 19 from the side with two coplanar, coherent beams incident at selected and complementary angles thereto with respect to the axis of core 19. The grating period is selected by varying the selected angles of incidence. Thus, a permanent change in the refractive index is induced in a predetermined region of core 19, in effect creating a phase grating effective for affecting light in core 19 at selected wavelengths.

As indicated in FIG. 1 the optical waveguide 15 and core 19 are attached or embedded in a section of structural component 22, in particular a plate for example. Core 19 contains characteristic periodic refractive index perturbations or gratings 16 in regions A, B and C thereof. A broadband light source 33 or tunable laser is focused through lens 33' onto the exposed end of core 19. A beam splitter 34 serves to direct the return beam from core 19 toward a suitable readout or spectrometer 37 for analysis. Alternatively, a transmitted beam passing out of the end 19' of core 19 could be analyzed.

Figure 3:
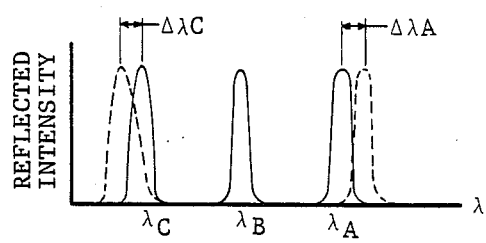
FIG. 3 is a graph of the intensity spectrum of the reflected light produced by injecting broadband light into the core of the waveguide with shifts in the spectral lines indicating strain at specific stations.

The spectrum of the reflected light intensities from strain gauge 13 is shown in FIG. 3. A complementary spectrum is also established passing out of the end 19' of core 19. The spectrum contains three narrowband output lines centered at respective wavelengths: $\lambda_A$, $\lambda_B$ and $\lambda_C$. These output signals arise by Bragg reflection or diffraction from the phase gratings 16 at respective regions A, B and C. In this example, regions A and C of structural component 22 have been strained by deformation, causing a compression and/or dilation of the periodic perturbations in the fiber core.

As a result, the corresponding spectral lines are shifted as shown in FIG. 3 to the dotted lines indicated. The respective wavelength differences delta $\lambda_A$ and delta $\lambda_C$ are proportional to strain in respective regions A and C.

Figure 4:
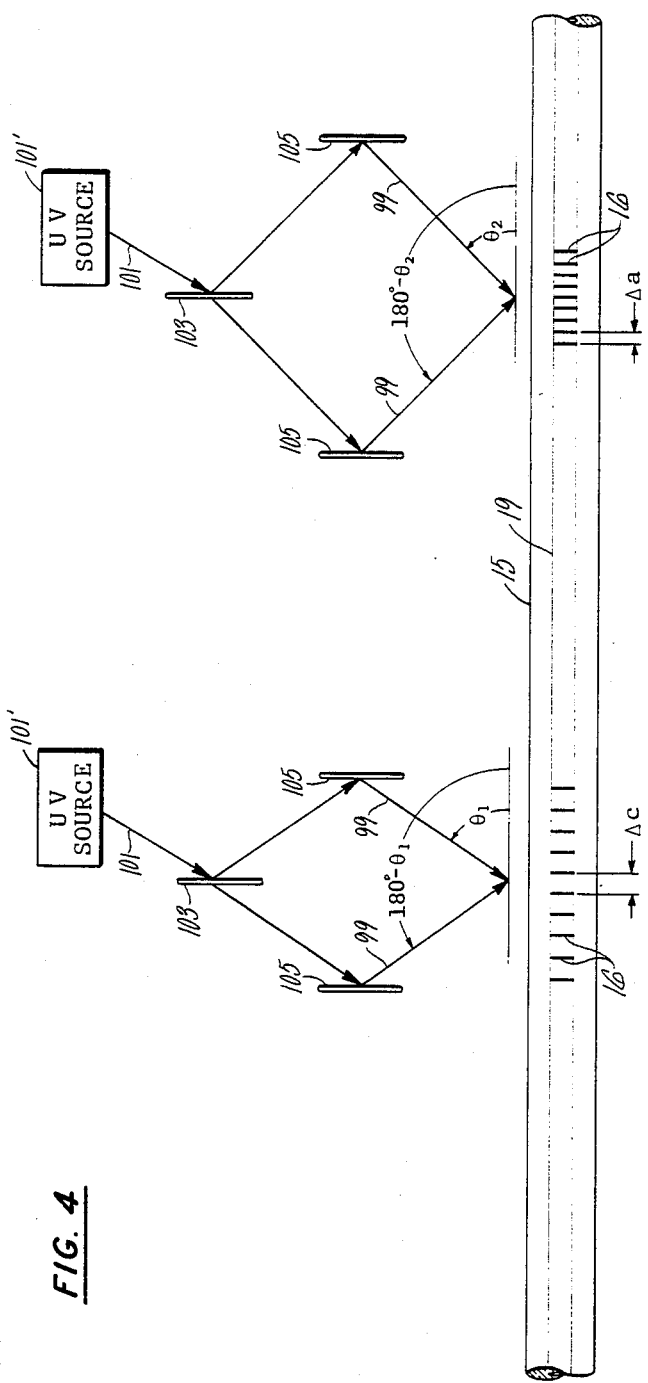
FIG. 4 shows a schematic illustration of a technique for establishing a grating pattern of variable spacing at selected positions along the length of the optical waveguide.

FIG. 4 illustrates the formation of periodic perturbations or gratings 16 in a region of fiber core 19 in response to exposure of core 19 to intense transverse ultraviolet radiation. Grating spacings $\Delta a$ and $\Delta c$ are controlled by the incidence angle of incident interfering beams 99 and beam 101. As can be seen, the angles of incidence of beams 99 are complements (i.e. their sum equals 180 degrees) to each other with respect to the axis of core 19. The incident pair of beams 99 can be derived from a single incident beam 101 passing in part through a beam splitter 103 and reflecting from spaced parallel reflectors 105. By increasing the separation between reflectors 105 and correspondingly varying the angles of incidence of beam 101, the angles of incidence of beams 99 upon core 19 can be controlled. Accordingly, the fringe spacing in grating 16 is varied as desired along the length of core 19, to permit a determination of strain or temperature corresponding to location along gauge 13.

Several spacings can be superimposed or colocated by this technique for the response set forth below.

Sensitivity to external perturbations upon structural component 22 and thus also upon core 19 depends upon the Bragg condition for reflected wavelength. In particular, the fractional change in wavelength due to mechanical strain or temperature change is:

$$d(\lambda_i)/\lambda_i = (q + \alpha)\Delta T + (1 + [\delta n/\delta\epsilon]/n)\epsilon$$
$$\simeq 8 \times 10^{-6}/°C + 8 \times 10^{-7}/\text{microstrain},$$

where:

$q$ is the thermooptic coefficient, which is wavelength dependent;

$\alpha$ is the expansion coefficient;

$\epsilon$ is the axial or longitudinal strain;

$\lambda_i$ is the wavelength reflected by the grating at location i along the core 19;

n is the refractive index of the optical waveguide; and $\Delta T$ is the change in temperature.

This relationship suggests a way to compensate for temperature changes along the length of the fiber sensor. In particular, if superimposed gratings of different spacings are provided, each of the two gratings will be subject to the same level of strain, but the fractional change in wavelength of each grating will be different because q is wavelength dependent.

Accordingly, each pair of superimposed gratings will display a corresponding pair of peaks of reflected or transmitted intensity. Accordingly, the shifts of these peaks due to a combination of temperature and strain can be subtracted. The shifts in these peaks due to strain will be the same in magnitude. Accordingly, any remaining shift after subtraction is temperature related. Thus, when it is desired to know the strain difference as between several locations possibly subject to a temperature difference, the temperature factor can be compensated.

The relationship therefore permits compensation for temperature variation during measurement, since the photoelastic and thermooptic effects are wavelength dependent. In other words, by superimposing two or more gratings at each location of interest, two or more spectral lines are established at each point of measurement. Strain will affect both lines equally; temperature will not. Thus, sufficient information is available to permit determination of the magnitude of strain and the temperature difference.

The information above is likely to cause others skilled in the art to conceive of other variations in carrying out the invention addressed herein, which nonetheless are within the scope of the invention. Accordingly, reference to the claims which follow is urged, as those specify with particularly the metes and bounds of the invention.

We claim:

1. A strain sensor for measuring strain in a region within a rigid body comprising:

an optical fiber, having a single core, disposed in a predetermined path passing through said region of said rigid body, said single core having at least one periodic optical grating, having a predetermined grating length along said fiber and a predetermined grating spacing in the visible region of the optical spectrum, formed within and throughout said core, whereby said fiber has at least one grating region containing said optical grating and said region comprises at least one discrete measurement region having a measurement region length substantially equal to said grating length;

means for passing broadband optical radiation in a predetermined wavelength range of the spectrum into said single core; and means for processing optical radiation emerging from said at least one core to form a measurement representative of strain within said region, including means for analyzing the spectrum of radiation reflected from said at least one grating and emerging from said single core to identify a characteristic wavelength corresponding to said predetermined grating spacing and means for comparing said characteristic wavelength with a stored corresponding reference wavelength to derive therefrom a measurement of the strain within said at least one discrete region, characterized in that:

said at least one grating region has two gratings having first and second grating spacings formed therein, whereby the spectrum of radiation emerging from said core contains two characteristic wavelengths corresponding to each of said first and second grating spacings; and said means for processing optical radiation compares said two characteristic wavelengths with two corresponding reference wavelengths to derive therefrom a temperature-corrected measurement of the strain within said at least one discrete measurement region.

2. A strain sensor according to claim 1, further characterized in that said fiber has at least two grating regions, each of which has said two gratings formed therein, whereby said means for processing optical radiation compares said two characteristic wavelengths for each of said at least two grating regions with said two corresponding reference wavelengths to derive a temperature-corrected measurement of the strain for each of at least two separate discrete measurement regions.

* * * * *